United States Patent [19]

Dubreuil

[11] Patent Number: 4,735,173

[45] Date of Patent: Apr. 5, 1988

[54] ANIMAL TRANSPORT UNIT

[76] Inventor: Jacques Dubreuil, Concession 7, Lot No. 20, R.R. No. 2, Dalkeith, Ontario, Canada, K0B 1E0

[21] Appl. No.: 861,456

[22] Filed: May 9, 1986

[51] Int. Cl.$^4$ ............................................. A61D 3/00
[52] U.S. Cl. ..................................... 119/103; 119/19; 119/20; 312/282; 312/312; 187/19
[58] Field of Search ......................... 119/15, 16, 17, 19, 119/20, 27, 83, 103; 312/312–316, 282; 108/147; 187/19; 5/93 R

[56] References Cited

U.S. PATENT DOCUMENTS

| | | | |
|---|---|---|---|
| 1,282,292 | 10/1918 | Reuss | 312/282 X |
| 1,902,946 | 3/1933 | Breed | 187/19 X |
| 2,902,976 | 9/1959 | Wilson | 119/19 |
| 2,939,756 | 6/1960 | Butcher | 312/282 |
| 3,025,651 | 3/1962 | Stanley | 187/19 X |
| 3,208,432 | 9/1965 | Fisk | 119/103 |
| 3,360,322 | 12/1967 | Hanifan | 108/147 |
| 3,454,317 | 7/1969 | Salkind | 312/312 |
| 3,921,585 | 11/1975 | Hall | 119/20 |
| 3,985,102 | 10/1976 | Yonezawa | 119/19 |
| 4,509,461 | 4/1985 | Peck | 119/103 |
| 4,527,512 | 7/1985 | Sugiura | 119/19 |
| 4,537,151 | 8/1985 | Bolton | 119/20 |
| 4,568,132 | 2/1986 | Watt | 312/312 |

Primary Examiner—David A. Scherbel
Assistant Examiner—Richard E. Chilcot, Jr.
Attorney, Agent, or Firm—Swabey, Mitchell, Houle, Marcoux & Sher

[57] ABSTRACT

An animal transport unit comprises a housing having a bottom, a top, a pair of side walls and a pair of end walls, the top being movable between an open position whereat the housing is fully uncovered to provide a top opening and a closed position whereat the top forms a closure covering the top opening, and a floor inside the housing and overlying the bottom, the floor being movably mounted for movement between an upper limit position adjacent the top and a lower limit position adjacent the bottom. The unit further includes an opening formed in at least one of the walls and openable closure means covering the wall opening, the closure means being openable to allow an animal to enter or exit the housing through the wall opening and to be supported on the floor when in the housing, and means for raising and lowering the floor to move same between the upper and lower limit positions whereby, when the top is in the open position, the floor can be raised to elevate the animal through the top opening of the housing for access to the animal. There are also provided ventilation means permitting air to enter and exit from the interior of the housing as well as roller means for enabling the housing to be moved with the animal therein to transport same. The animal transport unit according to the invention is particularly useful for transporting show animals at showgrounds where the top of the unit can be opened and the floor raised so as to form in the elevated position a grooming tabletop for grooming the animal and on which the animal once groomed may stand for inspection.

18 Claims, 6 Drawing Sheets

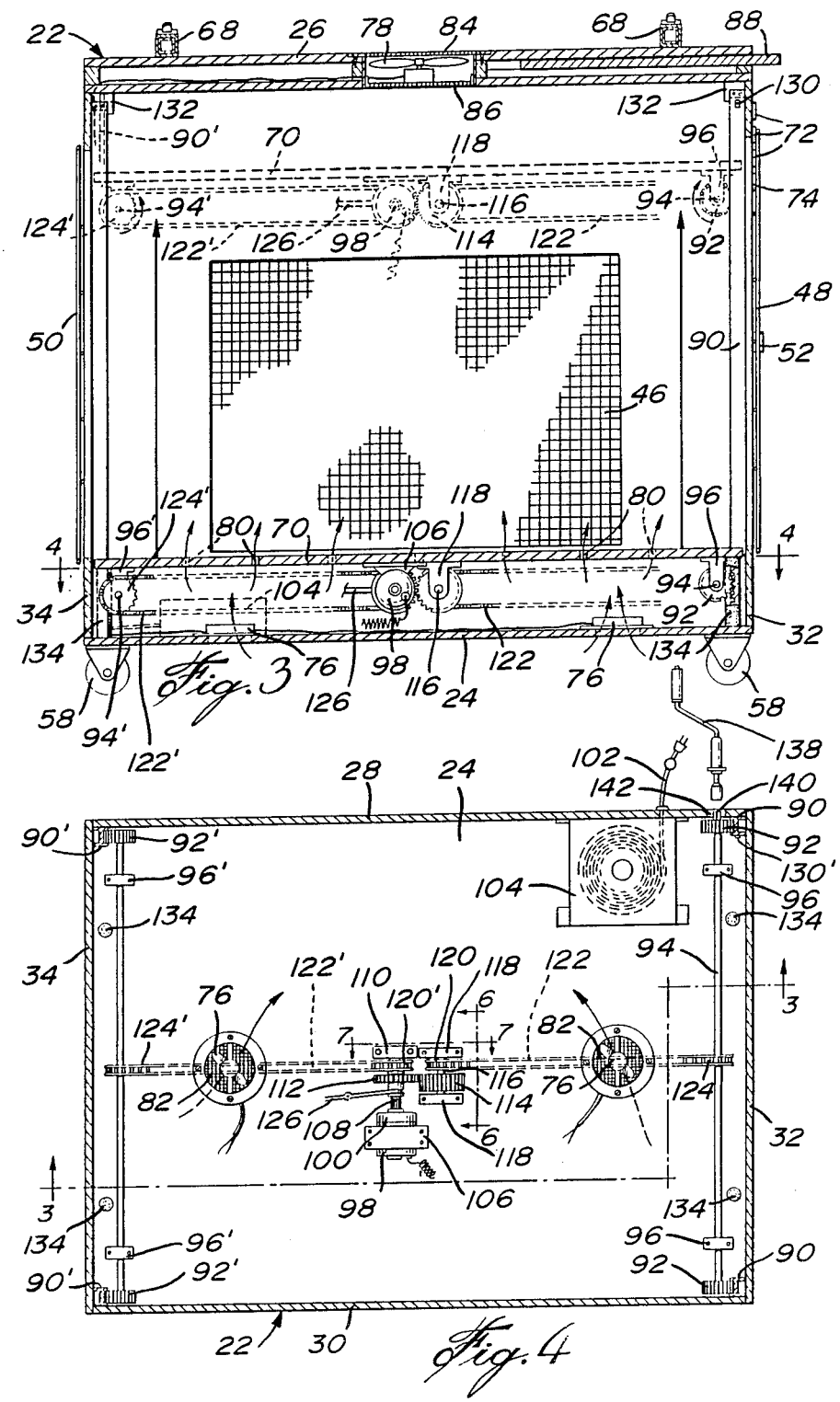

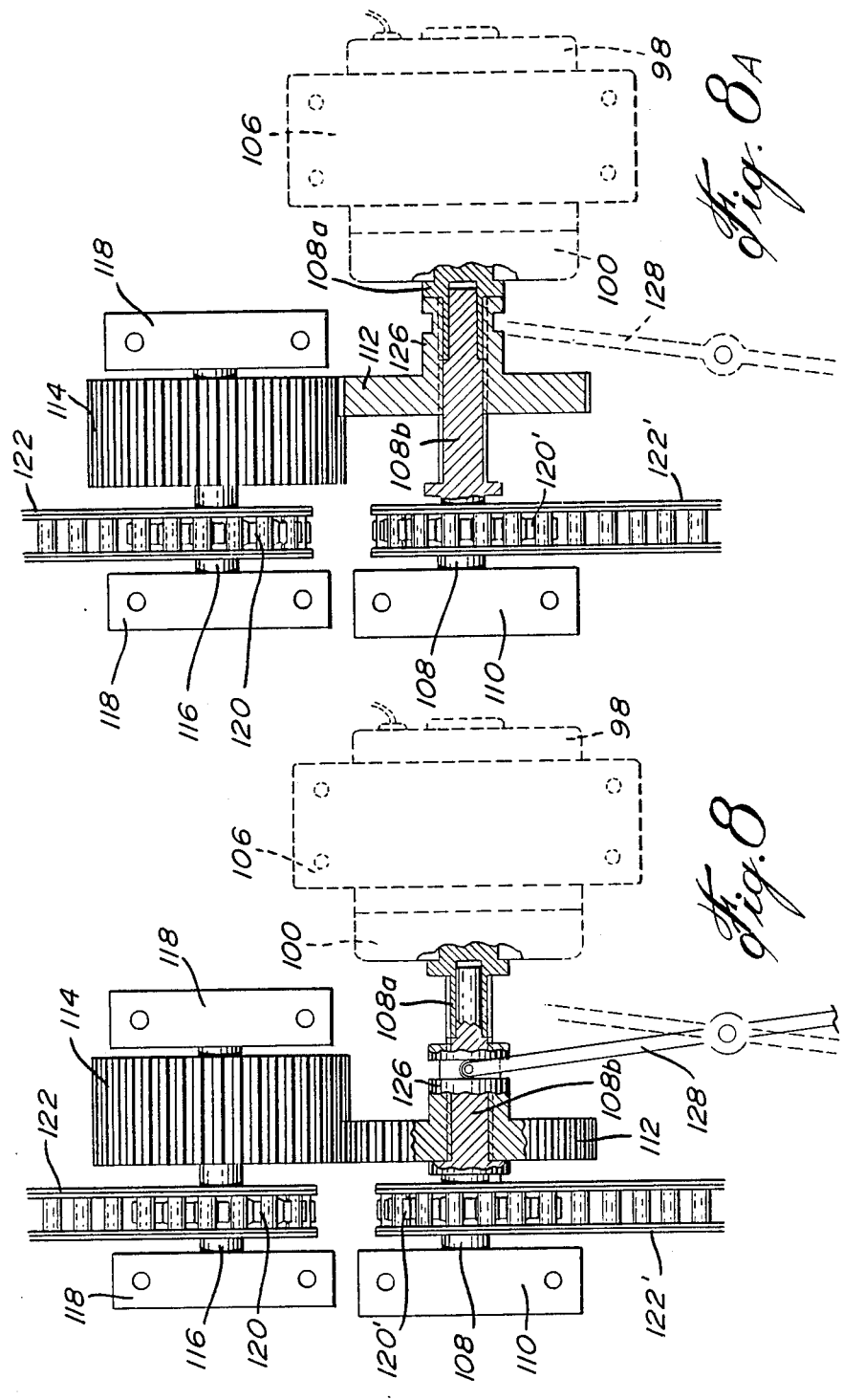

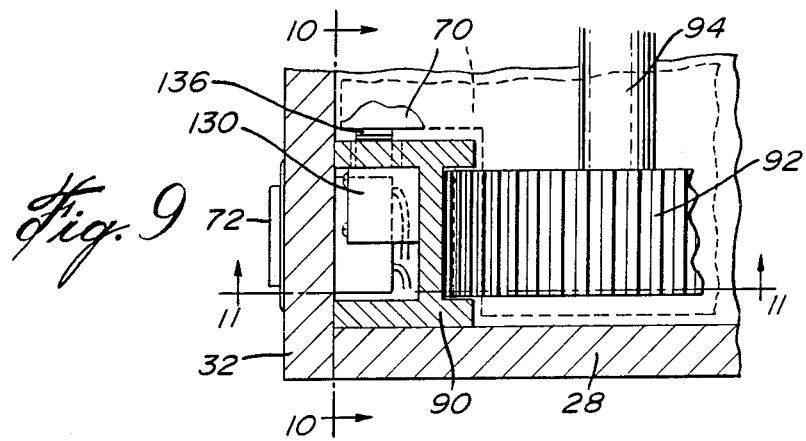
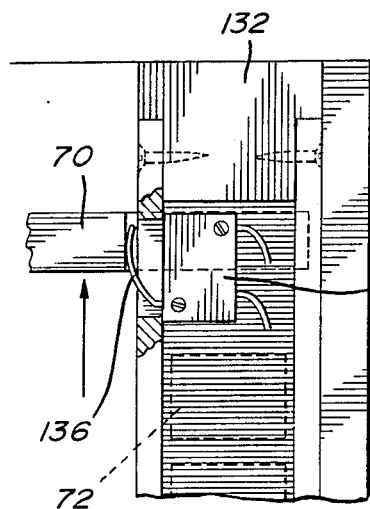
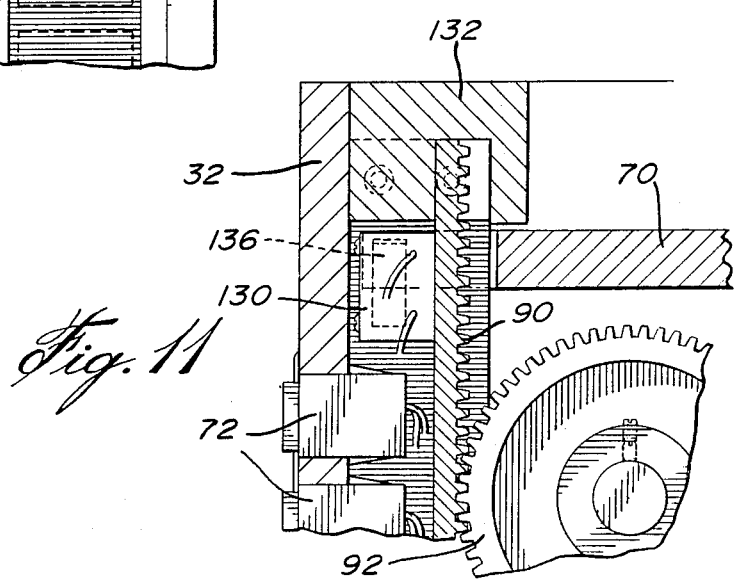

ns in opposite directions.

ANIMAL TRANSPORT UNIT

BACKGROUND OF THE INVENTION

The present invention relates to an animal enclosure and more particularly to an animal transport unit designed to aid in the transport and confinement of medium to large size animals, such as dogs, small wild felines and the like.

One difficulty commonly encountered at dog shows is getting the heavier breeds of dogs from floor level to the top of a grooming table where the dog can be groomed and inspected. This is particularly true since more than half of dog handlers are women. Thus, considerable physical effort is required in lifting for instance a 150-200 pound dog onto the grooming table, in addition to the possibility of injuring oneself and inflicting injuries to the dog being lifted.

U.S. Pat. No. 4,509,461 discloses an animal transport and grooming device which can be used to transport caged animals at showgrounds. Although such a device provides a tabletop member on which the animal can be groomed and inspected, one must still remove the animal from the cage transported on the device and lift the animal from a level close to the ground to the height of the grooming or inspection tabletop member.

Veterinary examination and treatment tables of the elevating type, on the other hand, are known, for instance from U.S. Pat. No. 3,208,432. These have been developed to lift animals from the floor to a suitable height for examination, diagnosis and treatment of minor conditions, without physical exertion and danger to the veterinarian. However, since there is no means for confining the animal once treated, the animal having undergone treatment may suffer a shock syndrome upon being transferred from the examination and treatment table into a cage for confinement and recovery.

SUMMARY OF THE INVENTION

It is therefore an object of the present invention to overcome the above drawbacks and to provide an animal transport unit enabling the animal to be elevated from within a confined area to a desired height out of the confined area for access to the animal and then lowered back directly into the confined area, while allowing the animal to be transported under confinement.

In accordance with the invention, there is provided an animal transport unit comprising a housing having a bottom, a top, a pair of side walls and a pair of end walls, the top being movable between an open position whereat the housing is fully uncovered to provide a top opening and a closed position whereat the top forms a closure covering the top opening, and a floor inside the housing and overlying the bottom, the floor being movably mounted for movement between an upper limit position adjacent the top and a lower limit position adjacent the bottom. The unit further includes an opening formed in at least one of the walls and openable closure means covering the wall opening, the closure means being openable to allow an animal to enter or exit the housing through the wall opening and to be supported on the floor when in the housing, and means for raising and lowering the floor to move same between the upper and lower limit positions whereby, when the top is in the open position, the floor can be raised to elevate the animal through the top opening of the housing for access to the animal. There are also provided ventilation means permitting air to enter and exit from the interior of the housing as well as roller means for enabling the housing to be moved with the animal therein to transport same.

Thus, according to the invention, the provision of a vertically movable floor arranged inside an animal housing provided with an openable top and serving to confine an animal supported on the floor enables the animal to be elevated through the top opening upon raising the floor, thereby allowing the animal to be conveniently groomed and inspected. In other words, the floor in the elevated or raised position becomes a grooming tabletop. The latter can also serve as an examination and treatment tabletop for use by veterinarians and allows an injured animal after having undergone treatment to be placed directly back into the housing for confinement and recovery without manipulating the animal by simply lowering the floor, thereby avoiding transfer of the animal to a separate cage and possible trauma to the animal upon such a transfer. The roller means, on the other hand, provides for easy mobility of the unit so that an animal which has undergone veterinary treatment can be transported under confinement and without manipulation to an area suitable for recovery.

According to a preferred embodiment of the invention, the floor is movably mounted by means of vertically extending rack means in meshing engagement with pinion means, the pinion means being rotatably mounted to the floor for displacement along the rack means to thereby permit the floor to be moved between the upper and lower limit positions. Preferably, the rack means comprise two pairs of spaced-apart racks with one pair of racks being provided on one of the walls of the housing and the other pair on an opposite wall, and the pinion means comprise two pairs of pinions associated respectively with the pairs of racks, the pinions of each pair being interconnected by an axle rotatable therewith. Thus, rotation of the axles carrying the pair of pinions causes the pinions to be displaced along the racks and the floor to be moved between the upper and lower limit positions.

The floor raising and lowering means advantageously include a reversible drive motor and mechanical connecting means interconnecting the motor with the axles for transmitting driving power thereto to rotate same, manually operated switch means being provided for starting, reversing and stopping the motor whereby to adjustably position the floor at any selected height between the upper and lower limit positions. Upper and lower limit switches may also be provided for automatically cutting off the motor when the floor reaches the upper and lower limit positions. For added security, upper and lower stop members may be provided for limiting respectively the upward movement and downward movement of the floor.

In a particularly preferred embodiment, the mechanical connecting means comprise first sprocket means interconnecting the drive shaft of the motor with one of the axles, second sprocket means interconnecting the other axle with a driven shaft, and gear means interconnecting the drive shaft with the driven shaft for rotating the driven shaft in an opposite direction to the drive shaft. This arrangement enables driving power to be transmitted from the drive shaft to the one axle via the first sprocket means and to the other axle via the gear means and second sprocket means for rotating the axles to thereby move the floor between the upper and lower limit positions.

In order to enable the floor to still be raised or lowered should there be no electricity available for powering the motor, the mechanical connecting means are arranged to permit the motor to be mechanically disconnected from the axles while the axles remain mechanically interconnected via the first and second sprocket means and the gear means, manually operated actuator means being provided for selectively connecting or disconnecting the motor and the axles as well as means for manually rotating the axles when the motor is disconnected therefrom. To this end, the drive shaft advantageously has a splined portion and is segmented at the splined portion to define a drive section connected to the motor and a shaft extension connected to the first sprocket means and adapted to freely rotate relative to the drive section of the drive shaft, and the gear means comprise a drive gear mounted on the drive shaft over the splined portion thereof and a driven gear mounted on the driven shaft and in meshing engagement with the drive gear. The drive gear is slidably movable along the splined shaft portion between a first position whereat the drive gear is in overlapping relation with the drive section and the shaft extension to couple same for enabling the drive section to rotate the drive gear and the shaft section to the first sprocket means and a second position extension in non-overlapping relation with the drive section to uncouple the drive section and shaft extension from one another for enabling the shaft extension to freely rotate relative to the drive section and the drive gear carried by the shaft extension to operate as an idler while remaining in meshing engagement with the driven gear. The actuator means may comprise a manually actuated lever connected to the drive gear for selectively positioning the drive gear at the first or second position to thereby mechanically connect or disconnect the motor and the axles.

On the other hand, the means for manually rotating the axles advantageously comprises a manually actuated crank lever connected to one of the axles through a vertically extending slot formed in one of the walls of the housing. Such a crank lever is operative to rotate the one axle whereby driving power is transmitted from the one axle to the other axle via the first and second sprocket means and the gear means for simultaneously rotating the other axle.

According to a further preferred embodiment, the wall opening is formed in one of the end walls of the housing and another opening is provided in the other end wall, the other wall opening being covered with a further openable closure means, and the unit further includes a demountable, elongated wall structure defining an animal exercise pen extending from one of the side walls to the other end wall to encompass the other wall opening. The further closure means is openable to allow the animal to gain access from within the housing to the exercise pen through the other wall opening. Such a pen is particularly useful in preventing a large animal from becoming lethargic, which would otherwise occur should the animal be kept inside the housing for an entire day. The demountable wall structure preferably comprises a plurality of panel sections which can be either detachably coupled or hinged together to permit the panel sections to be stored in stacked or folded side-by-side relation against the side wall; to this end, the side wall is provided with panel holding means for holding the panel sections in stacked or folded side-by-side relation when the wall structure is demounted.

The top of the housing is advantageously hinged to the one side wall along an upper edge thereof for pivotal movement between the open and closed positions whereby to project laterally from the one side wall in the open position and thereby form an awning extending into the pen, leg means being provided for supporting the top in the open extended position. Thus, where the unit is brought outdoors, the animal may shelter under the awning in the shade provided thereby.

BRIEF DESCRIPTION OF THE DRAWINGS

Further features and advantages of the invention will become more readily apparent from the following description of preferred embodiments as illustrated by way of examples in the accompanying drawings, in which:

FIG. 3 is a vertical sectional view of the unit of FIG. 1, taken along line 3—3 of FIG. 4 and showing hidden features;

FIG. 4 is a horizontal sectional view along line 4—4 of FIG. 3;

FIG. 4 is a fragmentary sectional view illustrating the floor of the unit at its upper limit position;

FIGS. 8 and 8A are fragmentary partsectional top views illustrating details of the motor drive shaft, gear and sprocket mechanism used to raise and lower the floor;

FIG. 9 is a fragmentary part-sectional top view showing the operation of an upper limit switch used to cut off the motor when the floor reaches the upper limit position;

FIG. 10 is a fragmentary sectional view taken along line 10—10 of FIG. 9;

FIG. 11 is another fragmentary sectional view taken along line 11—11 of FIG. 9;

FIGS. 5-7 is a fragmentary perspective view illustrating a different pen assembly which may be used in accordance with the invention.

DESCRIPTION OF PREFERRED EMBODIMENTS

Figure 1:
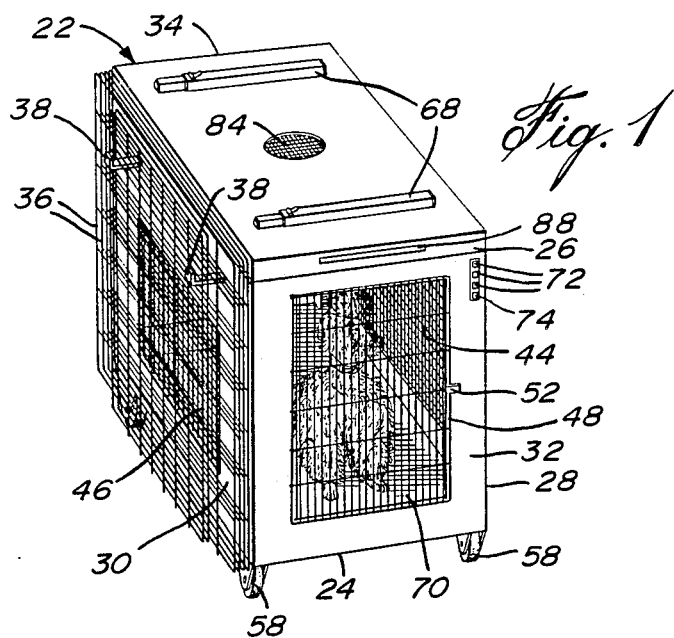
FIG. 1 is a perspective view of an animal transport unit according to the invention, shown with the top in the closed position and panel sections stored in stacked side-by-side relation against a side wall.
Figure 2:
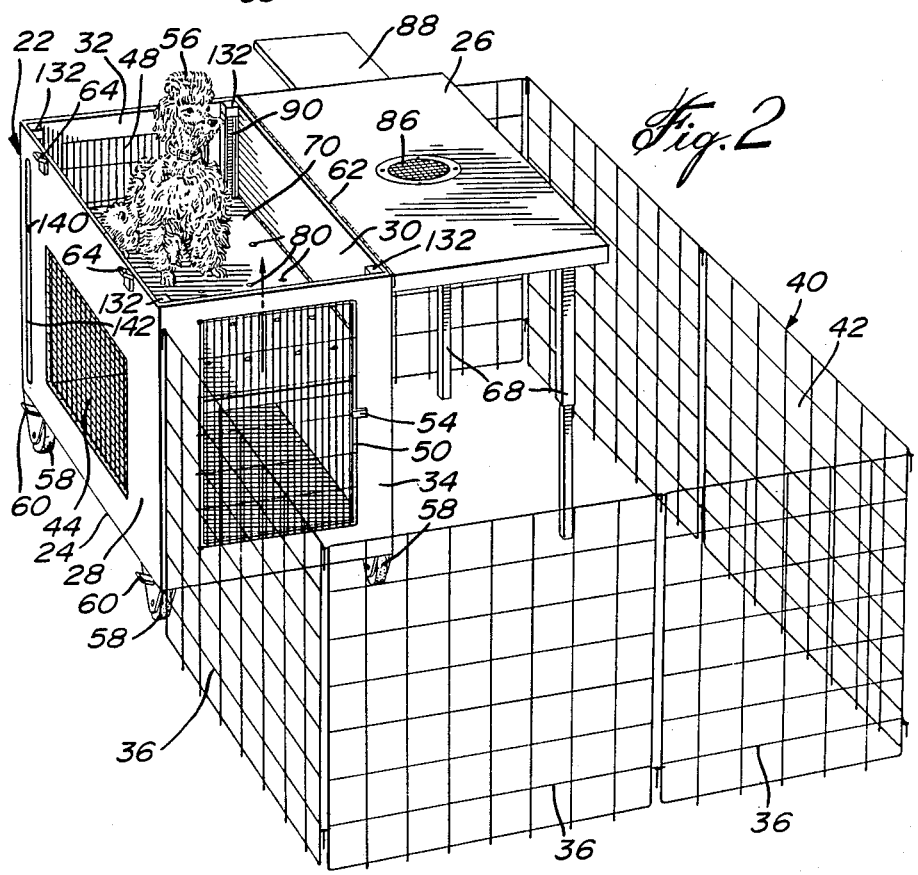
FIG. 2 is another perspective view of the unit illustrated in FIG. 1, showing the top in the open position and the panel sections assembled to define an animal exercise pen.

Referring first to FIGS. 1 and 2, there is illustrated an animal transport unit generally designated by reference numeral 20 and comprising a housing 22 having a bottom 24, an openable top 26, a pair of side walls 28,30 as well as front and back walls 32 and 34. The unit 20 further includes a plurality of grilled panel sections 36 which can be stored in stacked side-by-side relation against the side wall 30 and so held by hook members 38, as shown in FIG. 1. The panel sections 36 can be detachably coupled together and thus assembled to form a demountable, elongated wall structure 40 extending from the sidewall 30 to the back wall 34 to define an animal exercise pen 42, as shown in FIG. 2.

The side walls 28 and 30 of the housing 22 are provided with screened windows 44 and 46, whereas both the front and back walls 32 and 34 are provided with screened doors 48 and 50, suitable locks 52 and 54 being provided for retaining the front and back doors 48,50 closed. The front door 48 is openable to allow an animal such as a dog 56 to enter or exit the housing 22; the back door 50, on the other hand, is openable to allow the animal 56 to gain access from within the housing 22 to the exercise pen 42. The screened doors 48 and 50 as well as the screened windows 44 and 46 also permit air to enter and exit from the interior of the housing 22 while confining the animal 56 within the housing. Lockable caster wheels 58 are provided for enabling the housing 22 to be moved with the animal therein, the wheels 58 being locked by pressing down the members 60 so as to maintain the housing stationary whenever desired.

As shown, the top 26 is hinged to the side wall 30 along the upper edge 62 thereof and is thus pivotally movable between an open position (FIG. 2) whereat the housing 22 is fully uncovered to provide a top opening and a closed position (FIG. 1) whereat the top 26 forms a closure covering the top opening, suitable locks 64 being provided for retaining the top 26 in the closed position. As shown in FIG. 2, the top 26 in the open position projects laterally from the side wall 30 to thereby form an awning extending into the pen 42. A pair of telescopic legs 68 pivotally connected to top 26 are provided for supporting the top in the open extended position.

The housing 22 is provided with a motor-driven floor 70 which supports the animal 56 when in the housing and which can be moved between an upper limit position adjacent the top and a lower limit position adjacent the bottom. The movement of the floor 70 can be controlled by actuating a series of push-button switches 72 arranged on the front wall 32 to either raise, lower or stop the floor and thereby adjustably position same at any selected height between the upper and lower limit positions. An additional push-button switch 74 is provided for activating a pair of motor-driven fans 76 arranged underneath the floor 70 on the bottom 24 as well as a further motor-driven fan 78 arranged in the top 26, as best shown in FIGS. 3 and 4. The fans 76 are operative to force air through a plurality of small holes 80 formed in the floor 70 and into the housing 22 whereas the fan 78 is operative to withdraw air from the interior of the housing 22 when the top 26 is in the closed position, thereby increasing ventilation inside the housing. Both floor fans 76 are covered with screens 82, the ceiling fan 78 being likewise covered on both sides with screens 84 and 86, for security.

When the top 26 is moved to the open position shown in FIG. 2, the floor 70 can thus be raised to elevate the animal 56 through the top opening for access to the animal. The floor 70 in the elevated or raised position therefore becomes a grooming tabletop on which the animal can be groomed and inspected at a comfortable height. A pull-out shelf 88 is conveniently arranged in the top 26 for supporting grooming tools.

As shown in FIGS. 3 and 4, the floor is movably mounted by means of two pairs of vertically extending spaced-apart racks 90 and 90′, the pair of racks 90 being arranged on the wall 32 and the pair of racks 90′ on the wall 34, and two pairs of pinions 92 and 92′ associated respectively with the pairs of racks 90 and 90′, the racks and pinions being in meshing engagement with one another. The pinions 92 and 92′ are carried by respective axles 94 and 94′ rotatable therewith. The axles 94 and 94′ are rotatably mounted to the floor 70 underneath same by means of suitable brackets 96 and 96′. Thus, rotation of the axles 94 and 94′ carrying the pinions 92 and 92′ will cause the pinions to be displaced along the racks 90 and 90′ and the floor 70 to be moved between the upper and lower limit positions. To this end, a reversible drive motor 98 coupled with a speed reducer 100 is mechanically connected through a suitable sprocket and gear mechanism to the axles 94 and 94′ for transmitting driving power thereto to rotate same. The electricity necessary to power the electrical components of the housing 22, namely the fans 76,78 and motor 98, is supplied via a lead 102 connectable to a household electrical outlet, the lead 102 being conveniently retractable within the compartment 104. floor 70 by means of the bracket 106 has a drive shaft The motor 98 which is fixed underneath the 108 with a free end rotatably held by a bracket 110 fixed to the floor. A drive gear 112 is mounted on the drive shaft 108 and meshes with a driven gear 114 mounted on a driven shaft 116 which is rotatably mounted to the floor 70 by a pair of brackets 118. The driven shaft 116 also carries a sprocket wheel 120 rotatable therewith and connected via a sprocket chain 122 to a sprocket wheel 124 which is mounted on the axle 94 for rotation therewith. The axle 94′ and the drive shaft 108 are similarly interconnected by means of a sprocket wheel 120′ mounted on the drive shaft 108, sprocket chain 122′ and sprocket wheel 124′ mounted on the axle 94′.

The drive shaft 108 of the motor 98 is splined intermediate the speed reducer 100 and the sprocket wheel 120′ and is segmented at the splined portion thereof to define a drive section 108a which is connected to the motor 98 via the speed reducer 100 and a shaft extension 108b which is connected to the sprocket wheel 120′ and adapted to freely rotate relative to the drive section 108a, as best shown in FIGS. 8 and 8A. The drive section 108a is formed with an axial bore whereas the shaft extension 108b has an end portion of reduced diameter extending into the bore of the drive section 108a for support. The drive gear 112 which is formed with an integral sleeve 126 is slidaby movable along the splined shaft portion between the two positions shown in FIGS. 8 and 8A. In the latter position (FIG. 8A), the drive gear 112 is in overlapping relation with the drive section 108a and the shaft extension 108b to couple same for enabling the drive section 108a to rotate the drive gear 112 and the shaft extension 108b to transmit driving power from the drive section 108a to the sprocket wheel 120′. In the former position (FIG. 8), the drive gear 112 is positioned on the shaft extension 108b in non-overlapping relation with the drive section 108a to uncouple the drive section 108a and shaft extension 108b from one another for enabling the shaft extension 108b to freely rotate relative to the drive section 108a and the drive gear 112 carried by the shaft extension 108b to operate as an idler while remaining in meshing engagement with the driven gear 114. In this manner, the motor 98 can be mechanically connected to the axles 94,94′ by positioning the drive gear 112 as shown in FIG. 8A or mechanically disconnected from the axles 94,94' by positioning the drive gear 112 as shown in FIG. 8, the axles 94 and 94' remaining interconnected via the sprocket mechanism 120,122,124, gear mechanism 112,114 and other sprocket mechanism 120',122',124' when the motor 98 is disconnected from the axles 94,94'.

A manually actuated lever 128 engaging the sleeve 126 of the drive gear 112 is provided for selectively positioning the drive gear at either aforementioned position to thereby mechanically connect or disconnect the motor 98 and the axles 94,94'. Although not shown, the lever 126 can be suitably extended to terminate short of the wall 34 of the housing 22 so as to be easily accessible by one's fingers through a suitable horizontal slot (not shown) formed in the wall 34 below the door 50.

Figure 5:
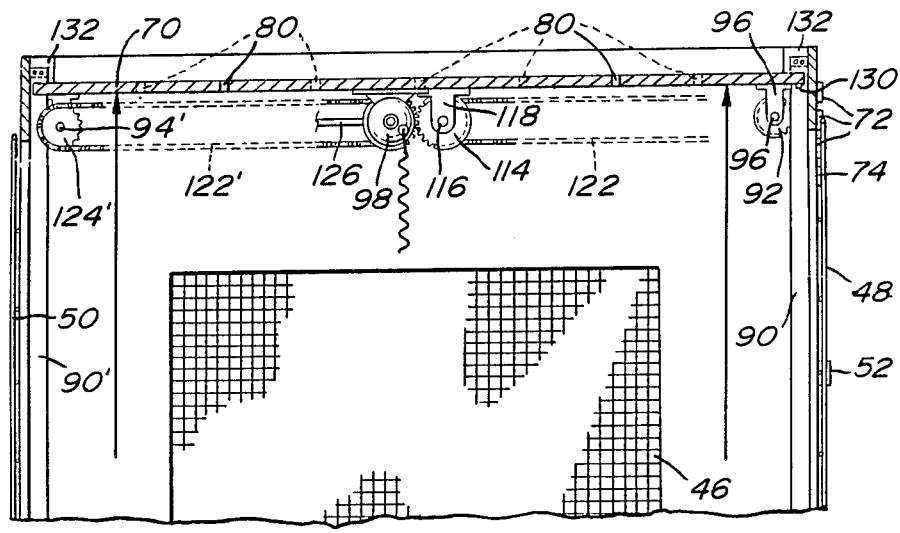

When the motor 98 is mechanically connected to the axles 94,94', driving power can thus be transmitted to the axles for rotating same to thereby cause the pinions 92 and 92' to be displaced along the racks 90 and 90' and the floor 70 to be moved between the upper and lower limit positions. The floor 70 can therefore be displaced from the lower limit position shown in FIG. 3 to the upper limit position shown in FIG. 5, or vice-versa. Upper and lower limit switches 130 and 130' are provided for cutting off the motor when the floor 70 reaches the upper and lower limit positions. For added security, upper and lower stop members 132 and 134 are also provided for limiting respectively the upward movement and downward movement of the floor 70; as shown in FIGS. 3 and 4, the lower stop members 134 are in the form of vertically extending rods which are secured at their lower end to the bottom 24 and which can be made of rubber.

The upper limit switch 130 which arranged at the upper extremity of one of the racks 90 is illustrated in more detail in FIGS. 9, 10 and 11. As shown, the switch 130 has an upwardly extending arm 136 which is adapted to engage the floor 70 when the latter reaches the upper limit position and to thus activate the switch for cutting off the motor 98. The lower limit switch 130' is the same as the switch 130, except that its arm extends downwardly instead of upwardly.

It should be noted that when the floor 70 is in the elevated position and the motor 98 is cut off such as by the upper limit switch 130 or by one of the push-button switches 72 for stopping the floor, the speed reducer 100 to which the motor 98 is coupled acts as a brake to prevent the floor from descending by gravity. The floor 70 can thus be adjustably positioned at any selected height between the upper and lower positions and maintained or held in position at the selected height. In other words, forward or reverse drive must be provided by the motor 98 to either raise or lower the floor 70.

In the case where there is no electricity available for powering the motor 98, the floor 70 can still be raised or lowered by first mechanically disconnecting connecting the motor from the axles 94,94'; this is done by moving the drive gear 112 to the position shown in FIG. 8 by means of the lever 128. Thereafter, a manually actuated crank lever 138 is connected to the axle 94 at the toothed extremity 140 thereof, through a vertically extending slot 142 formed in the sidewall 28 of the housing 22, as shown in FIG. 4. Since the axles 94,94' remain interconnected via the sprocket mechanism 120,122,124, gear mechanism 112,114 and other sprocket mechanism 120',122',124' where the gear 112 acts as an idler, actuation of the crank lever 138 will cause simultaneous rotation of the axles 94,94'. When the floor 70 has been raised to a selected height with the crank lever 138, the drive gear 112 is then moved back to the position shown in FIG. 8A in order to mechanically connect the motor 98 with the axles 94,94' and thus provide braking by the speed reducer 100, thereby maintaining the floor 70 in position at the selected height; the lever 126 for moving the drive gear 112 can be conveniently reached through opening the door 50 since the lever 126 is displaced with the floor 70, as shown in FIG. 3.

Figure 12:
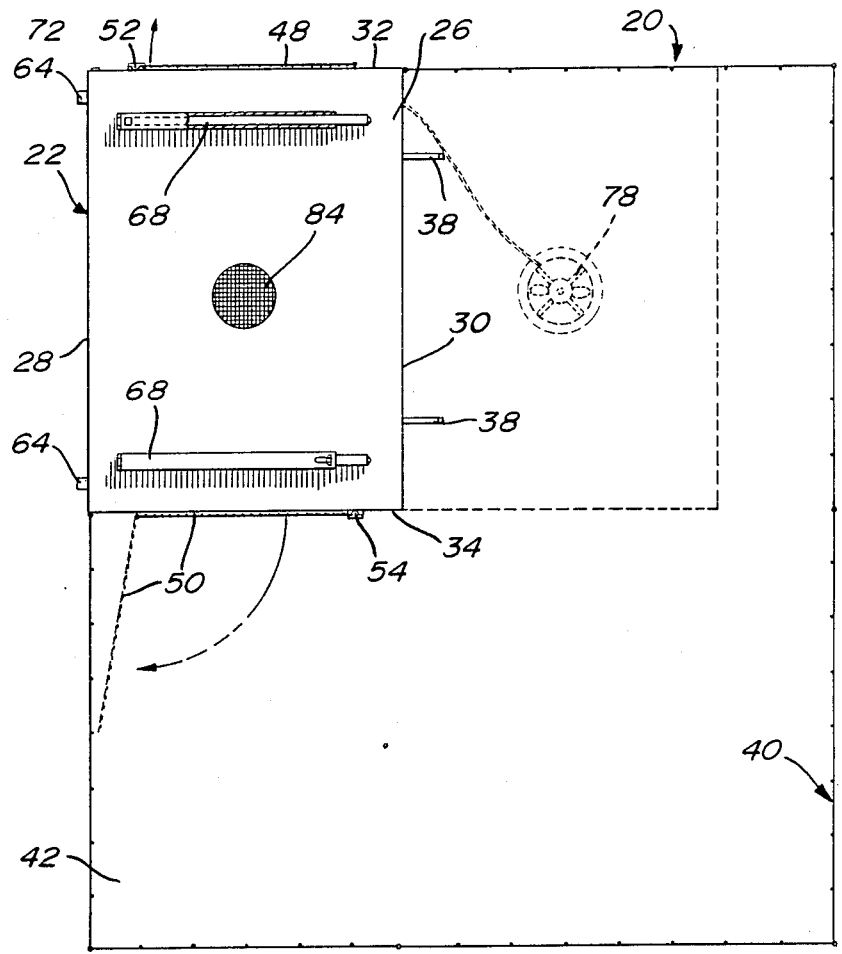
FIG. 12 is a top view of the unit and pen assembly shown in FIG. 2, but with the top in the closed position.
Figure 13:
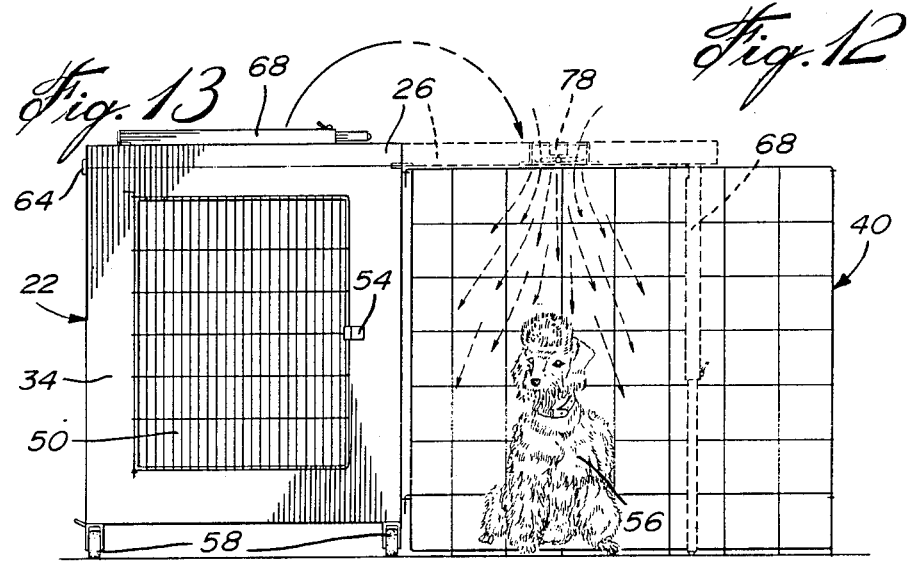
FIG. 13 is a side elevation view of unit and pen assembly illustrated in FIG. 12.

Turning to FIGS. 12 and 13 which show the unit 20 and the pen assembly 40 thereof, the top 26 of the housing 22 can be opened by pivotally moving same to the open position represented in broken lines, whereat it projects laterally from the sidewall 30 to form an awning extending into the pen 42. The telescopic legs 68 can then be pivotally moved from a horizontal to a vertical position as shown in FIG. 13, the lower telescoping legs portions being extended to the desired length so as to support the top 26 in the open position. Thereafter, the back door 50 may be opened to allow the animal 56 to gain access from within the housing 22 to the pen 42 where the animal may not only exercise but also shelter under the awning defined by the top 26 in the open position. As shown in FIG. 13, when the top 26 is in the open extended position, the fan 78 is operative to direct a flow of air underneath the awning and to thus cool the animal 56 and relieve the latter from anxiety due to nervousness at an animal show.

Figure 14:
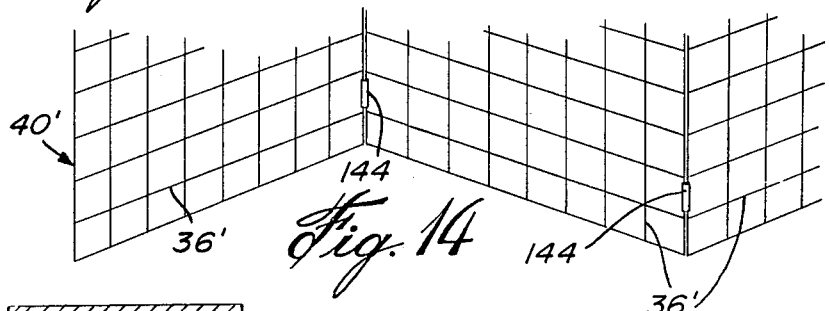
FIG. 14 which is on the same sheet of drawings containing
Figure 6:
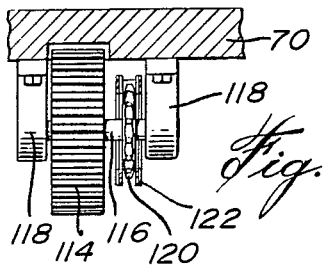
FIG. 6 is a fragmentary view taken along line 6—6 of FIG. 4.
Figure 7:
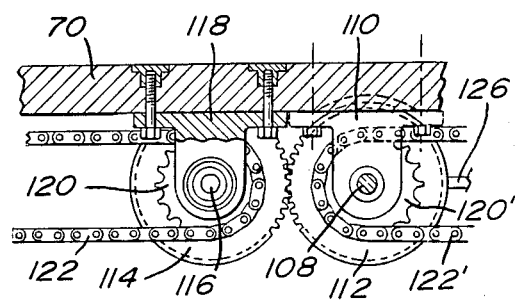
FIG. 7 is another fragmentary view taken along line 7—7 of FIG. 4.

FIG. 14 illustrates a different pen assembly 40' comprising a plurality of foldable panel sections 36' which are hinged together by means of sleeves 144 loosely receiving the endmost vertical rods of two adjacent panel sections. The panel sections 36' can thus be stored in folded side-by-side relation against the side wall 30 and so held by the hook members 38, in a manner similar to that shown in FIG. 1.

I claim:
1. An animal transport unit comprising:
a housing having a bottom, a top, a pair of side walls and a pair of end walls, said top being movable between an open position whereat said housing is fully uncovered to provide a top opening and a closed position whereat said top forms a closure covering said top opening;
a floor inside said housing and overlying said bottom, said floor being movably mounted for movement between an upper limit position adjacent said top and a lower limit position adjacent said bottom by means of two pairs of spaced-apart vertically extending racks and two pairs of pinions associated respectively with said pairs of racks and in meshing engagement therewith, the pinions of each pair being interconnected by an axle rotatable therewith for allowing said pinions to be displaced along said racks to thereby permit said floor to be moved between said upper and lower limit positions;
an opening formed in at least one of said walls and openable closure means covering said wall opening, said closure means being openable to allow an animal to enter or exit said housing through said wall opening and to be supported on said floor when in said housing;
means for positively raising and lowering said floor under control to move same between said upper and lower limitpositions while maintaining said floor stable during raising or lowering such that when said top is in said open position, said floor can be raised to elevate said animal through the top opening of said housing for access to said animal, said floor raising and lowering means including a motor having a drive shaft and mechanical connecting means interconnecting said motor with said axles for transmitting driving power thereto to rotate same, said mechanical connecting means comprising first sprocket means interconnecting said drive shaft with one of said axles, second sprocket means interconnecting the other axle with a driven shaft, and gear means interconnecting said drive shaft with said driven shaft for rotating said driven shaft in an opposite direction to said drive shaft, whereby driving power is transmitted from said drive shaft to said one axle via said first sprocket means and to said other axle via said gear means and second sprocket means for rotating said axles to thereby move said floor between said upper and lower limit positions;

ventilation means permitting air to enter and exit from the interior of said housing; and roller means for enabling said housing to be moved with said animal therein to transport same.

2. An animal transport unit as claimed in claim 1, wherein said pinions are rotatably mounted to said floor.

3. An animal transport unit as claimed in claim 2, wherein one of said pairs of racks is provided on one of said walls of said housing and the other pair on an opposite wall.

4. An animal transport unit as claimed in claim 1, wherein said motor is a reversible drive motor and said floor raising and lowering means further include manually operated switch means for starting, reversing and stopping said motor whereby to adjustably position said floor at any selected height between said upper and lower limit positions.

5. An animal transport unit as claimed in claim 4, further including upper and lower limit switches for cutting off said motor when said floor reaches said upper and lower limit positions.

6. An animal transport unit as claimed in claim 5, further including upper and lower stop members for limiting respectively the upward movement and downward movement of said floor.

7. An animal transport unit as claimed in claim 1, wherein said mechanical connecting means are arranged to permit said motor to be mechanically disconnected from said axles while said axles remain mechanically interconnected via said first and second sprocket means and said gear means, manually operated actuator means being provided for selectively connecting or disconnecting said motor and said axles as well as means for manually rotating said axles when said motor is disconnected therefrom.

8. An animal transport unit as claimed in claim 7, wherein said drive shaft has a splined portion and is segmented at said splined portion to define a drive section connected to said motor and a shaft extension connected to said first sprocket means and adapted to freely rotate relative to said drive section of said drive shaft, and said gear means comprise a drive gear mounted on said drive shaft over said splined portion thereof and a driven gear mounted on said driven shaft and in meshing engagement with said drive gear, said drive gear being slidably movable along said splined shaft portion between a first position whereat said drive gear is in overlapping relation with said drive section and said shaft extension to couple same for enabling said drive section to rotate said drive gear and said shaft extension to transmit driving power from said drive section to said first sprocket means and a second position whereat said drive gear is positioned on said shaft extension in nonoverlapping relation with said drive section to uncouple said drive section and shaft extension from one another for enabling said shaft extension to freely rotate relative to said drive section and said drive gear carried by said shaft extension to operate as an idler while remaining in meshing engagement with said driven gear, and wherein said actuator means comprises a manually actuated lever connected to said drive gear for selectively positioning said drive gear at said first or second position to thereby mechanically connect or disconnect said motor and said axles.

9. An animal transport unit as claimed in claim 7, wherein said means for manually rotating said axles comprises a manually actuated crank lever connected to one of said axles through a vertically extending slot formed in one of said walls of said housing, said crank lever being operative to rotate said one axle whereby driving power is transmitted from said one axle to the other axle via said first and second sprocket means and said gear means for simultaneously rotating said other axle.

10. An animal transport unit as claimed in claim 1, wherein said ventilation means include at least one further wall opening and screen means covering said further wall opening to permit air to enter and exit from the interior of said housing while confining said animal within said housing.

11. An animal transport unit as claimed in claim 12, wherein said openable closure means comprises a screened door serving as further ventilation means.

12. An animal transport unit as claimed in claim 10, wherein said floor is provided with a plurality of apertures to permit air flow therethrough and wherein said ventilation means further include first fan means arranged underneath said floor for forcing air through said floor apertures and into said housing.

13. An animal transport unit as claimed in claim 12, wherein said ventilation means further include second fan means arranged in said top of said housing for withdrawing air from the interior of said housing when said top is in said closed position.

14. An animal transport unit as claimed in claim 1, wherein said wall opening is formed in one of said end walls and another opening is provided in the other end wall, said other wall opening being covered with a further openable closure means, and wherein said animal transport unit further includes a demountable, elongated wall structure defining an animal exercise pen extending from one of said side walls to said other end wall to encompass said other wall opening, said further closure means being openable to allow said animal to gain access from within said housing to said exercise pen through said other wall opening.

15. An animal transport unit as claimed in claim 14, wherein said demountable wall structure comprises a plurality of panel sections detachably coupled together to permit said panel sections to be stored in stacked side-by-side relation against said one side wall, and wherein said one side wall is provided with panel holding means for holding said panel sections in stacked side-by-side relation when said wall structure is demounted.

16. An animal transport unit as claimed in claim 14, wherein said demountable wall structure comprises a plurality of panel sections hinged together to permit said panel sections to be stored in folded side-by-side relation against said one said wall, and wherein said one side wall is provided with panel holding means for holding said panel sections in folded side-by-side relation when said wall structure is demounted.

17. An animal transport unit as claimed in claim 14, wherein said top of said housing is hinged to said one side wall along an upper edge thereof for pivotal movement between said open and closed positions whereby to project laterally from said one side wall in the open position and thereby form an awning extending into said pen, leg means being provided for supporting said top in the open extended position.

18. An animal transport unit as claimed in claim 17, wherein said ventilation means include fan means arranged in said top to withdrawn air from the interior of said housing when said top is in said closed position, said fan means being operative to direct a flow of air underneath said awning when said top is in said open extended position.

* * * * *